Figure 1:
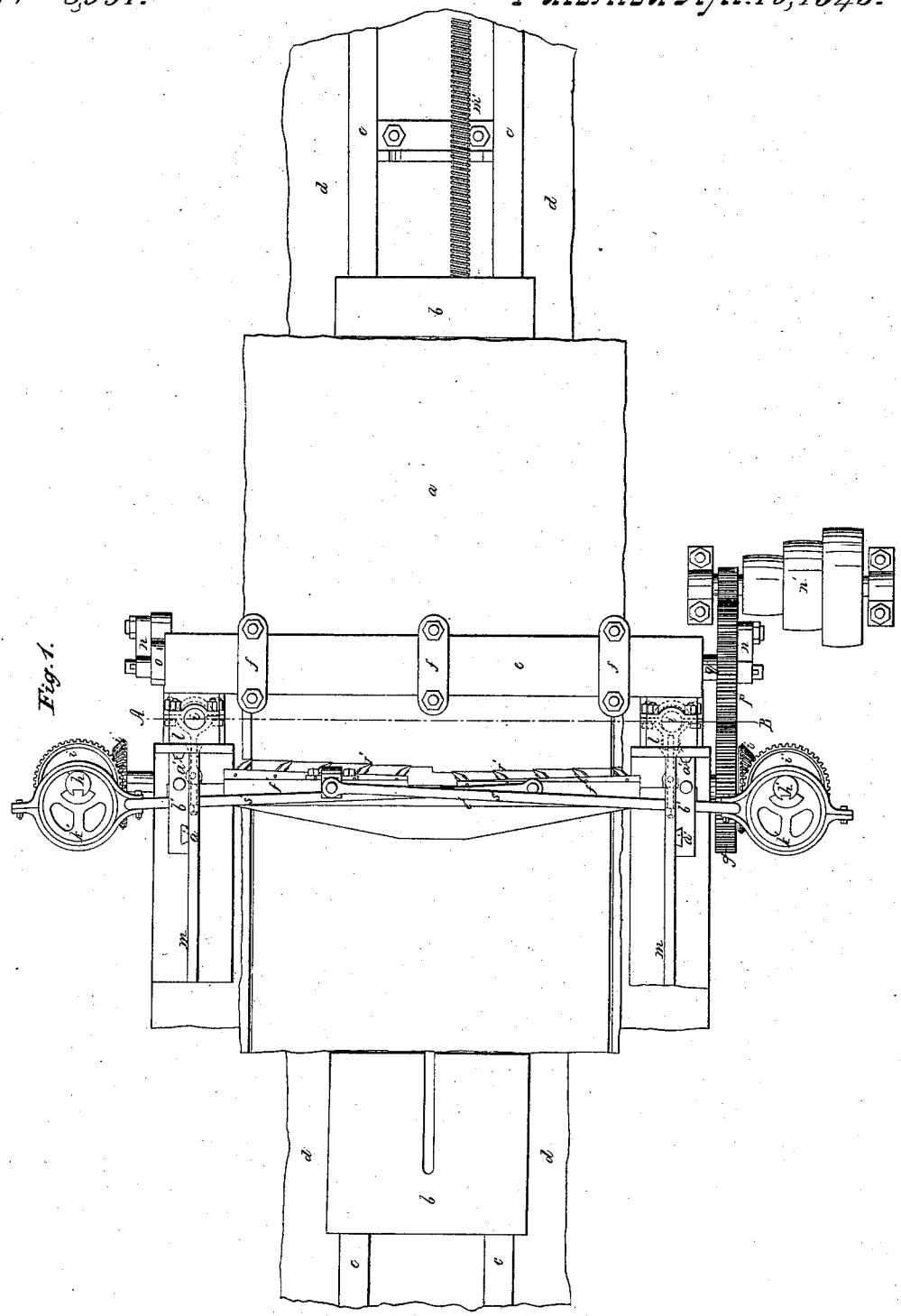

D. Pfister,
Sawing Stone.

Nº 3,991.    Patented Apr. 10, 1845.

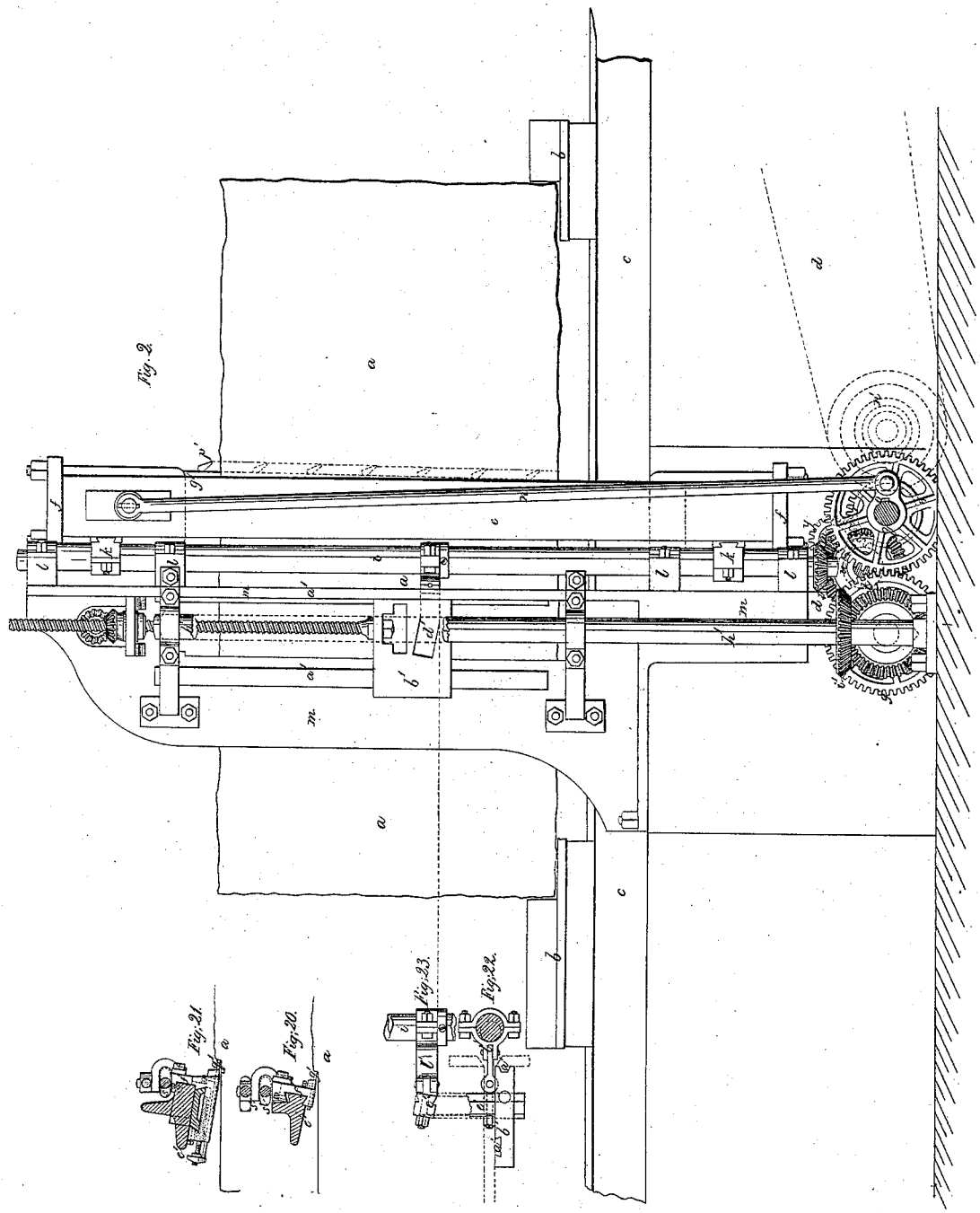

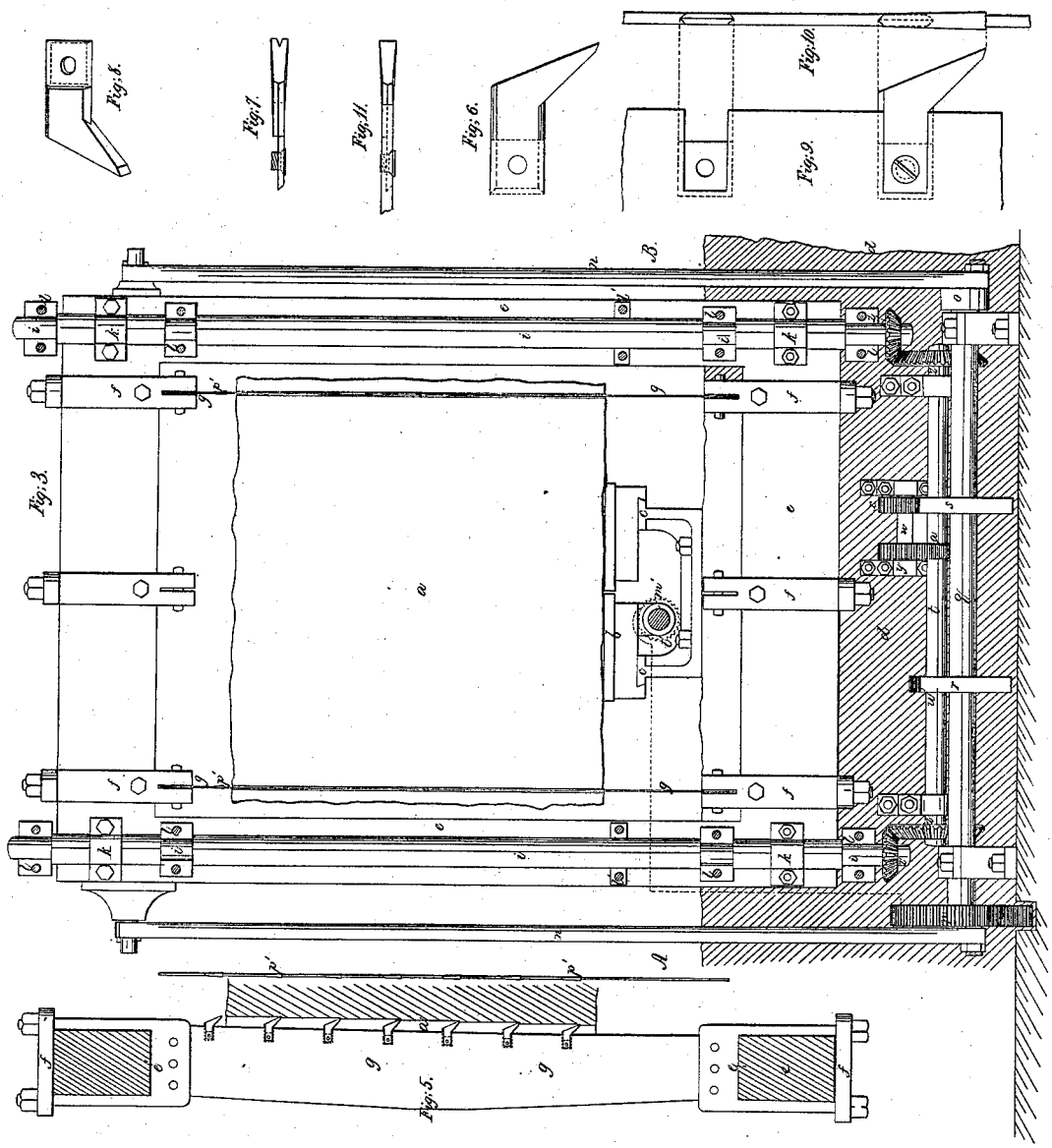

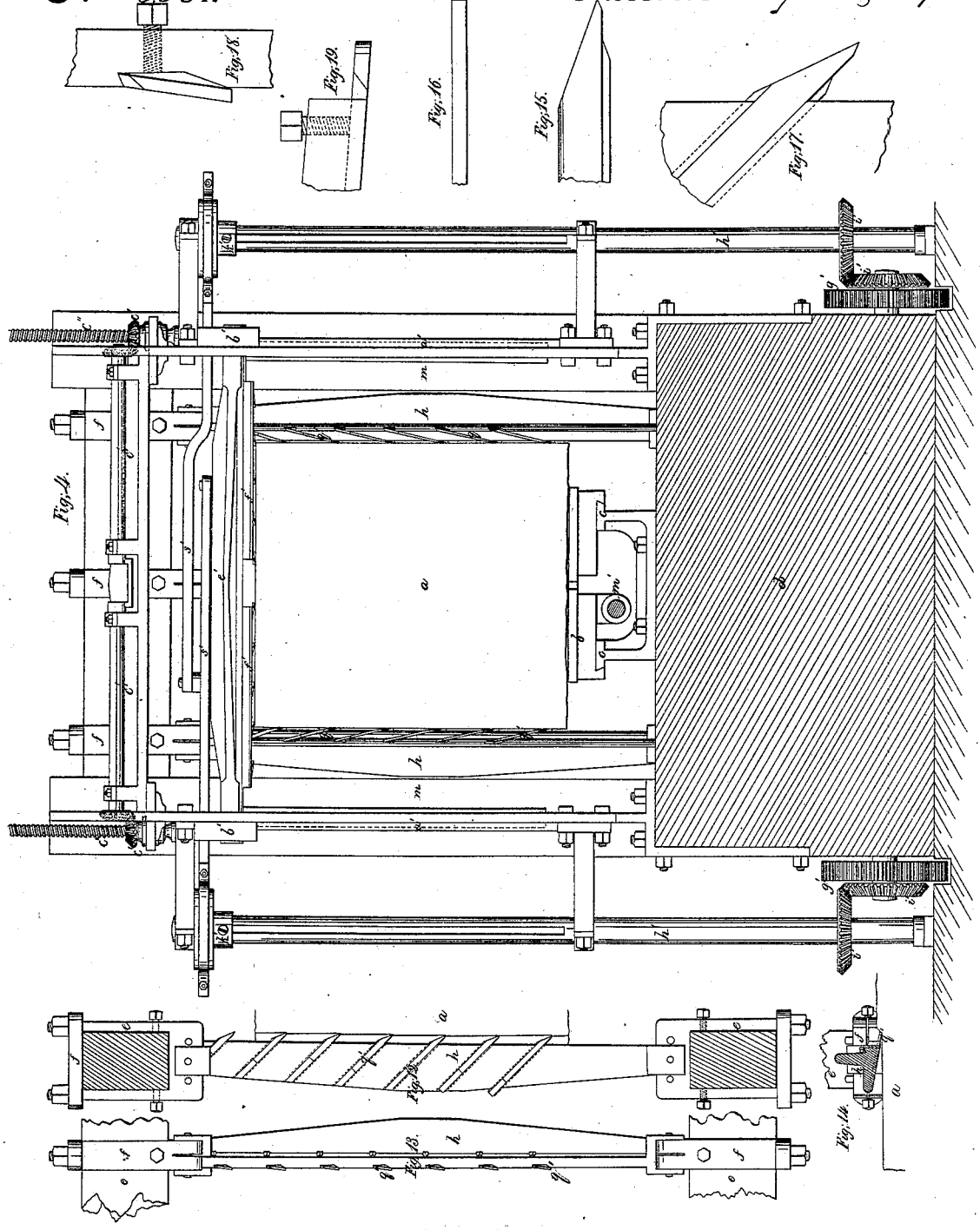

UNITED STATES PATENT OFFICE.

DANIEL PFISTER, OF MANEDORF, SWITZERLAND, ASSIGNOR TO T. KELLER.

SAWING AND DRESSING STONE.

Specification of Letters Patent No. 3,991, dated April 10, 1845.

*To all whom it may concern:*

Be it known that I, DANIEL PFISTER, of Manedorf, in the Canton of Zürich, in Switzerland, have invented a new and useful Machine for Cutting and Planing Stone; and I do hereby declare that the following is a full, clear, and exact description thereof, reference being had to the accompanying drawings, which form a part of this specification, in which—

Figure 1, Tab. I, the machine is represented in the plan cutting through a block of stone in two places perpendicularly; and at the same time cutting or planing the upper surface horizontally.

Fig. 2, Tab. II, represents the side view of the machine where the block of stone is only cut through perpendicularly but not planed horizontally at the same time.

Fig. 3, Tab. III, shows the cross profile of the machine according to the lines A, B, of Fig. 1.

In Fig. 4, Tab. IV, the machine is represented in the back view showing how it cuts at the same time, on one stone, two perpendicular sides, and cuts or planes the upper side. $a$, is the stone block, $b$, $b$, two traveling tables, on which the block lies, and by means of coupling chains between the joints of the slides is fastened, so that the traveling tables must move in equal proportions together. $c$ is the bed of the machine on which the traveling-tables $b$ $b$ move backward and forward. It is on a solid foundation $d$, of stone work, or other strong material. $e$ is a frame on which the movable clevis $f$ $f$ are fixed above and below, and on the latter the instruments for the perpendicular working of the stone are fastened. If the stone is to be cut through, the saw-plates $g$, $g$, must be placed in the groove of the clevis and fastened with bolts.

Fig. 5, Tab. III, represents the view of such a sawing-plate with cutting instruments $p'$, fastened to it. By turning the screws on the clevis $f$, $f$, the same can be tightened at will.

The Fig. 6, 11, Tab. III, give the form and construction of the stone cutting instrument for cutting straight through in its natural size, and exhibits distinctly, how the same is connected with the saw-plates.

Fig. 6 shows the single cutting instrument in the side view, Fig. 7, in the plan and Fig. 8, in the perspective.

The form of the shank of the cutting instrument corresponds exactly with the openings or grooves in the saw-plate, represented in Fig. 9, from the side, and in Fig. 10 as seen from the front. To prevent the side movement of the cutting instruments, the front part of the same fits exactly with its under and upper edges in the grooves of the openings in the saw-plates, the back part of the shank of the cutting instrument is only half the thickness of the saw-plate and fits exactly in the recess for it formed in the saw-plates, and is fastened by means of a screw passing through both of the cutting instruments immovably fastened in the plate, in this manner are shown in Fig. 9, from the side, Fig. 10, from the front, and in Fig. 11, drawn in the plan. The cutting instruments are made of English cast-steel, the saw-plates, of steel plates. For marble it is desirable to furnish the edge of the cutting instrument with a groove according to the given manner in Fig. 7; with sand stones this is not necessary. The edge of the cutting instrument must always be somewhat broader than the thickness of the plate, so that the latter may not rub on the sides of the stone.

For cutting or planing the stone perpendicularly, as represented in Tab. IV, the suitable saw-plates for it must be stiff and quite unpliant, they are strengthened with flanches $h$, $h$, and as they have to sustain some side pressure they are attached to the clevis $f$, $f$, which they grip and are fastened with bolts. In Fig. 12 there is such a strengthened sawplate drawn from the side, in Fig. 13, from the front, and in Fig. 14 from the plan. The side, in which the cutting instruments $q'$ are found, is turned somewhat obliquely toward the stone, and by means of the screws on the clevis $f$, $f$, the strengthened saw-plates can be duly tightened.

The Figs. 15–19 represent the form and construction of the cutting instruments, for cutting or planing, and their connection with the strengthened saw-plate of the natural size.

Fig. 15, shows a single cutting instrument, in a side view, and Fig. 16 in the groundplan. To unite the same firm and immovably with the strengthened saw-plate in the latter dove-tailed formed grooves are made in which the cutting instrument is put with its upper and under edge exactly fitting said grooves, and is fastened by means of a set screw on the back, as represented in Figs. 13 and 18.

Fig. 17, shows a fastened cutting instrument from the side, Fig. 18 from the front, and Fig. 19 from the under side. As the grooves are cut through the whole breadth of the strengthened saw-plate, the cutting instruments can be made of any desirable length and be regulated as Fig. 12 explains. The cutting instruments are made of cast steel.

Now as the construction of the cutting apparatus has been described; before the progress of the machines can be developed, the nature of the invention and the attack of the instruments upon the stone must be more fully explained. The original idea consists in, that a single cutting instrument only attacks the stone a little, or in other words, only cuts off a very thin layer of stone. The principal difficulty to be vanquished in the mechanical working of the stone, is, that the blades are soon heated by the violent friction, and thereby lose their temper and become blunt. The continual cooling of the instrument by the dropping of water cannot well take place in stone work, as is the case in iron work.

In iron work tough chips fall with which the water does not mix, but with stones the water forms with the sandy substance an adhesive mass, which is difficult to be removed, and thereby hinders the working. In certain cases, however, this cooling method is not to be lost sight of. It can be easily combined with the apparatus in any way, and for that reason is not quite rejected by the inventor. The means here applied for hindering the rapid blunting of the instruments is that the same cutting instrument is not drawn through the whole length of the stone; but that the work to be accomplished is divided upon many instruments, so that each single one has to accomplish an inconsiderable distance, therefore only to work upon the straight place lying before it; and after this trifling work it has time for cooling. According to the height of the stone to be cut, so the number of instruments to be placed in the plates, are increased or diminished at will, the distance of which from one another; or the distance which each has to make is adjusted, according to the hardness of the stone. With hard stones the distance is less than with soft ones, therewith each instrument can accomplish its due work; each must project beyond the next below it the thickness of the layer of stone to be removed or cut away. In this manner the upper instrument always works so much in advance, that the under one after every stroke finds an unhindered attack on the layer which it has to cut and therefore not be obliged to allow the instruments to protrude unequally from the saw plate, the edge which is against the stone stands at the upper end as much more forward as the projecting of the instrument requires. See for this Tab. III, Fig. 5, and Tab. IV, Fig. 12.

The cutting instruments always move only in an elliptical direction but the stone moves after every stroke so much towards the instruments, as the same have to cut in. The difficulty of removing the sand, is by this means overcome, as the instruments retire after every cut from the stone, and so leave the sand room to fall down, and then again to advance on the stone to a new cut. By this backward movement another visible aim is attained, namely, the cutting instruments do not graze with the edge on the stone during the stroke.

The velocity of the instruments through the stone depends on the hardness of the latter. On very hard sandstones it accomplishes eight feet in a minute; to accomplish which the machine makes a stroke of six inches and eight strokes in a minute. With soft stones this velocity is increased, but on very hard marble only one-third of the said velocity is applied. It is the same with the thickness of the layer to be removed, or the attack of the cutting instruments. On hard sand stones it amounts to $\frac{1}{2}$ a line, or four lines per minute. On hard marble only the $\frac{1}{4}$. Such proportions can easily be conformed to every material, as experience will prove the most suitable, and the hardest stones by the necessary diminution of the velocity of the stroke, and the layer to be cut, can be worked. On very soft stones on which the cutting instruments do not blunt themselves so much or on harder stones when the thickness of the same, or the distance which the cutting instruments have to make is only trifling, the instruments can be conducted by a stroke at will through the entire thickness of the stone at the same time; by which the advantageous effect of the machine is considerably heightened. After this detailed explanation of the original idea, the description of the mechanism follows.

A solid foundation of stone work or other suitable material ($d$,) is made, on which the machine is based; on this foundation the bed ($e$) is laid for the carriages ($b$, $b$,) to slide on, and to the same foundation a stout cast iron frame ($m$, $m$,) is bolted firmly to sustain the moving parts of the machine which are as follows: Two vertical shafts ($i$, $i$,) are held in their positions by boxes or collars ($l$, $l$,) attached to the frame pieces ($m$, $m$,). One of these shafts ($i$) is on each side of the carriage ($b$,) that moves between them; and upon them the frame or gate ($e$) moves by means of four slips ($k$, $k$,) which connect them; the journal of the shafts are smaller where the collars ($l$, $l$,) are placed and are made eccentric to the rest of the shaft, so that when said shaft is turned half around the frame or gate (*e*) is moved from, or to, the stone (*a*,) to be cut, for the purpose hereafter described. The perpendicular movement of the gate (*e*) is caused by two connecting rods (*n, n,*) that are attached below to a crank (*o*) on the ends of the principal shaft (*q*,) under the gate, and at their upper ends to the gate. On the principal shaft (*q*) as shown in Fig. 3, Tab. III, are two wheels (*r* and *s*) having spur teeth around one quarter of their circumference (one of these is shown in profile *r*, Fig. 2, Tab. II,) a second shaft (*t*) is placed parallel with (*q*) on which is affixed two spur wheels (*u* and *v*) the wheel (*u*) is placed in the same plane as *r*, above named which, as it turns its cogs toward, *u*, causes it to revolve one fourth around; a short shaft (*w*) is placed a little above and between the others (*q* and *t*) that bears two pinions (*x* and *y*); the pinion *y* works into a spur wheel *v* on the second shaft *t*, and *x* is opposite the wheel *s* on shaft *q*. When the teeth on this last mentioned wheel takes into the pinion *x* it will be perceived that it causes the second shaft (*t*,) to revolve in a direction opposite to that caused by the direct action of (*r*) before described; on each end of the shaft (*t*) there is a bevel wheel *z* gearing into a bevel pinion *z* of half the diameter, on the lower end of the upright shafts *i*; one of which is opposite each side of the gate *e* as above stated and is made to turn a half revolution around while the shaft (*q*) (that moves the gate up and down) turns one fourth around. The operation of this is as follows: the gate rising is thrown forward by the semi revolution of the shaft (*i*) on which it slides; it then descends, making a cut in the stone, by means of the cutters hereafter described, then it recedes by means of another semi revolution of the shafts, and so on until the work is completed.

For the horizontal cutting or planing of the stone, on the pillars *m, m*, are placed four ribs or ways *a'* on which the two slides *b', b'* move up and down by means of screw *c''*. The slides are both placed by the horizontal bevel wheels *e'* in which there is a nut that works into the screw at any height at will, by the turning of shaft *c'*, Fig. 4, by hand. In the apertures *d'* Tab II, of the slides *b' b'* the ends of the ends of the cast iron beam *e'*, strengthened by flanches, are put, the form of which is represented in Tab. II, Fig. 20, in profile. Fig. 21. On this beam two slides *f', f'*, move, on which the cutting instruments *r'* are placed in the same manner as in the perpendicular planing above described, only here horizontally. The cutting instruments are likewise the same in construction; they are directed somewhat obliquely toward the stone, as in general all the cutting apparatus is. The principle of the working of the horizontal cutting or planing, is like the principle of perpendicular planing or cutting through, as here every cutting instrument cuts against its own thin layer of stone, but horizontally; and the cutting instruments projecting one before the other horizontally, effect an incision in the same manner as the vertical one before described.

It is supposed in general by planing that the unevenness to be done away with, is not unusually thick; for example, that it does not surpass the thickness of an inch in the sand stone. When the unevennesses are thicker, it does not suit to apply the planing apparatus, but the apparatus for cutting through, because with that the piece cut away is at the same time gained for plate. Thus plates the thickness of ½ an inch and less can be cut. If the unevenness generally proposed in planing is in different places thicker than the breadth of the cutting instruments, these cut a groove under the unevenness and cause it easily to break off in morsels; in order that the sand, which remains in the horizontal planing, does not prevent the cutting instruments, and these do not rub themselves on the stone on their returning, the cutting apparatus is drawn obliquely upward, after having cut, and advances afterward to a new cut in the stone as hereafter described. Experience has shown, that at the end of a cut where the instruments come out from the stone, splinters are always forced away. Now to hinder this, there are placed, instead of one, two cutting apparatus, each of which works the half of the stone from the outside to the middle, and one cutting apparatus projects a little beyond the other, so that the instruments do not meet together in the middle. Care has then to be taken that no unevennesses is left behind. The horizontal planing apparatus is placed on that account behind the perpendicular cutting apparatus because only by its means faultless edges can be obtained. It is evident that this working system distinguishes itself essentially from all the methods till now known or adopted, for planing stones or iron, and is certainly advantageous, as the instruments work the desired level directly through so that it is finished at once, without passing over a second time.

The movement for the horizontal cutting or planing is caused in the following manner: By the spur wheel *p* on the main shaft, the spur wheels *q'*, the bevel wheels *i' i'*, on the two upright cylinders *h' h'*, are turned. On these cylinders are eccentrics *k' k'*, by which the slides *f', f'*, with their cutting instruments, are moved, by means of the two rods *s'*, attached to beam *e'* and communicate the due backward and forward movement. The back movement of the cutting apparatus from the stone is also caused by the eccentric cylinders $i\ i$, as by the half turn of them the beam $e'$ by means of the movable pedestals $l'$, $l'$, slide in the apertures $d'$ and is pushed obliquely upward, see Figs. 22 and 23; by the other half turn of the cylinders $i\ i$, the beam $e$, and with it the cutting apparatus returns again into the former position. As the whole apparatus for the horizontal planing rests in the two slides $b'\ b'$, all the parts, belonging to it, can be placed higher or lower at the same time by the motion of the shaft $c'$ always according to the height of the stone to be worked.

The eccentrics $k'\ k'$, move in the grooves of the cylinders $h'\ h'$ and are fastened by set screws at any height the cutters are set to. To bring the stone against the cutting instruments a ratchet that goes from the spur wheel $p$ is joined with the ratchet wheel, $t'$, and this with the screw $m'$, so that by each stroke the ratchet wheel $t'$ and the screw $m'$ is turned, and by this means the traveling-tables $b$, $b$, and with them the stone $a$, is moved against the cutters as much as these instruments must handle or cut.

From the designs, and the description of this machine one will have conceived that with the saws and side plates even faces on rectangular stones to any dimensions can be cut. By an altered position of the stone, acute, angular or obtuse angular stones can be made with it: for example, for arches as for common walls. But the principle of this cutting system can also be employed for the making of curved faces particularly for example, to cut the surfaces around pillars, or to cut or flute channels in stone, which operations require an altered mechanism, but can be effected by the already known mechanical expedients.

I claim—

1. Employing several cutting instruments attached to a straight plate and moving over a space equal to their distance apart so as only to be in action a small portion of time before they are relieved, substantially as herein set forth, the cutters each projecting over the one below it the depth of the cut to be made, as above fully made known.

2. The method of moving the cutters from the stone, after every cut, as herein described, by means of the revolving of the vertical shafts $i'\ i$, or any other means substantially the same for the purposes herein described.

DANIEL PFISTER.

Witnesses:
R. VOGEL WISER,
A. WEGMANN.